(12) United States Patent
Mahmoud (10) Patent No.: US 10,483,764 B2
(45) Date of Patent: Nov. 19, 2019

(54) IRRADIANCE BASED SOLAR PANEL POWER POINT TRACKING

(71) Applicant: Worcester Polytechnic Institute, Worcester, MA (US)

(72) Inventor: Yousef Mahmoud, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 141 days.

(21) Appl. No.: 15/862,942

(22) Filed: Jan. 5, 2018

(65) Prior Publication Data

US 2018/0198285 A1 Jul. 12, 2018

Related U.S. Application Data

(60) Provisional application No. 62/443,176, filed on Jan. 6, 2017.

(51) Int. Cl.
*H02J 3/38* (2006.01)
*H02S 40/32* (2014.01)
*H02S 50/00* (2014.01)

(52) U.S. Cl.
CPC .............. *H02J 3/385* (2013.01); *H02S 40/32* (2014.12); *H02S 50/00* (2013.01); *Y02E 10/563* (2013.01)

(58) Field of Classification Search
CPC .......... H02J 3/385; H02S 40/32; H02S 50/00; Y02E 10/563
See application file for complete search history.

(56) References Cited

PUBLICATIONS

Petrone, et al, "Analytical Model of Mismatched Photovoltaic Fields by Means of Lambert W-Function", Solar Energy Materials & Solar Cells 91, 2007, 1652-1657.
Orozco-Gutierrez, et al., "A Technique for Mismatched PV Array Simulation", Renewable Energy, 2013, pp. 417-427.
Mahmoud, et al., An Enhanced MPPT Method Combining Model-based and Heuristic Techniques; IEEE Transactions on Sustanable Energy, vol. 7, No. 2, Apr. 2016, 576-585.

*Primary Examiner* — Robert L Deberadinis
(74) *Attorney, Agent, or Firm* — Armis IP Law, LLC (57) ABSTRACT

A power point tracking apparatus employs irradiance detection for performing Maximum Power Point Tracking (MPPT) of a PV panel. The apparatus controls an operating voltage of a PV panel inverter by regulating the operating voltage of the inverter at a computed optimal voltage based on a detected irradiance of light on the solar panel providing power to the inverter to result in a maximum power generation from the solar panel. The inverter receives the DC (direct current) from the solar panel and generates an AC (alternating current) signal at a fixed voltage (typically 110-120 v) usable by grid based power consumers.

15 Claims, 5 Drawing Sheets

IRRADIANCE BASED SOLAR PANEL POWER POINT TRACKING

RELATED APPLICATIONS

This application claims the benefit under 35 U.S.C. § 119(e) of U.S. Provisional Patent Application No. 62/443,176, filed Jan. 6, 2017, entitled "IMAGE-BASED POWER POINT TRACKING FOR PHOTOVOLTAIC (PV) SYSTEMS," incorporated herein by reference in entirety.

BACKGROUND

Recent decades have been marked by continued evolution of technologies seeking alternatives to combustible fossil fuels and hydrocarbon based energy sources. Solar panels represent a substantial segment of this effort, due to the relative abundance of sunlight and its effectively "free" availability. Photovoltaic (PV) panels are solar panels that generate electricity directly from a photovoltaic effect of light (typically sunlight) directed at a semiconductor material. Deployment of photovoltaic panels involves placement in an area of substantial sun exposure, and it should be apparent that power output is a function of the area of exposed PV panels. Other considerations include an angle of irradiance, defined by an angle of the irradiating sunlight, and a strength of the irradiating sunlight, which can be obscured by shading and cloud cover. Relative power output is defined by a power curve relating irradiated energy (light) to a voltage output of the PV panel.

SUMMARY

A power point tracking apparatus employs irradiance detection for performing Maximum Power Point Tracking (MPPT) of a PV panel. The apparatus controls an operating voltage of a PV panel inverter by regulating the operating voltage of the inverter at a computed optimal voltage based on a detected irradiance of light on the solar panel providing power to the inverter to result in a maximum power generation from the solar panel. The inverter receives the DC (direct current) from the solar panel and generates an AC (alternating current) signal at a fixed voltage (typically 110-120 v) usable by grid based power consumers.

Configurations herein are based, in part, on the observation that a power curve results from the reality that PV panels often cannot operate at peak output due to ambient parameters such as incident light and temperature. The power output curve defines effective power that can be extracted from a solar panel at a particular voltage. As is known in the art, electrical power is defined by volts*amps, and thus inverters and/or converters may be employed to transform a higher voltage/lower current to a higher current at a lower voltage, for example. The power curve represents a maximum power (typically expressed in watts) by identifying a voltage value corresponding to a peak in the power curve that defines the maximum power. Operation of a connected load, such as an inverter, at the voltage corresponding to the power curve peak results in a maximum power output.

Unfortunately, conventional approaches to MPPT suffer from the shortcoming that local peaks, rather than global peaks, are often identified as an optimal operating voltage. This typically results from curve scanning or traversal to "walk" the power curve and identify a maximum, or peak, and failing to identify a global maximum. Accordingly, configurations herein substantially overcome the shortcomings of conventional MPPT by detecting irradiated light on a solar panel, and computing the maximum power point, or voltage, at which to operate an inverter or other load for realizing maximum power output from a PV panel based on the detected light.

A camera captures an image indicative of incident light falling on the solar panel, and generates an image indicative of the irradiated light as reflected and received by the camera. A mapping is performed, from the generated image to individual cells of the PV panel, and an incident light computed for each cell based on the image intensity in view of an angle and reflectance of the PV panel. Based on the mapping, an intensity of irradiated light falling on each cell of the PV panel is computed, and the operating voltage corresponding to the maximum power point expressed on the power curve computed.

In further detail, the claimed approach depicts a method of regulating an operating voltage of a solar panel inverter by receiving camera readings indicative of incident light on a solar panel, and computing, based on the received readings, an operating voltage corresponding to a maximum power generation capability of the solar panel. An inverter connected to the solar panel, receives output power from the solar panel, and regulates the inverter output power based on the operating voltage.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example PV panel and MPPT voltage computation. Different arrangements of PV panels may be employed without departing from the irradiance based computation of the MPP voltage.

Figure 1:
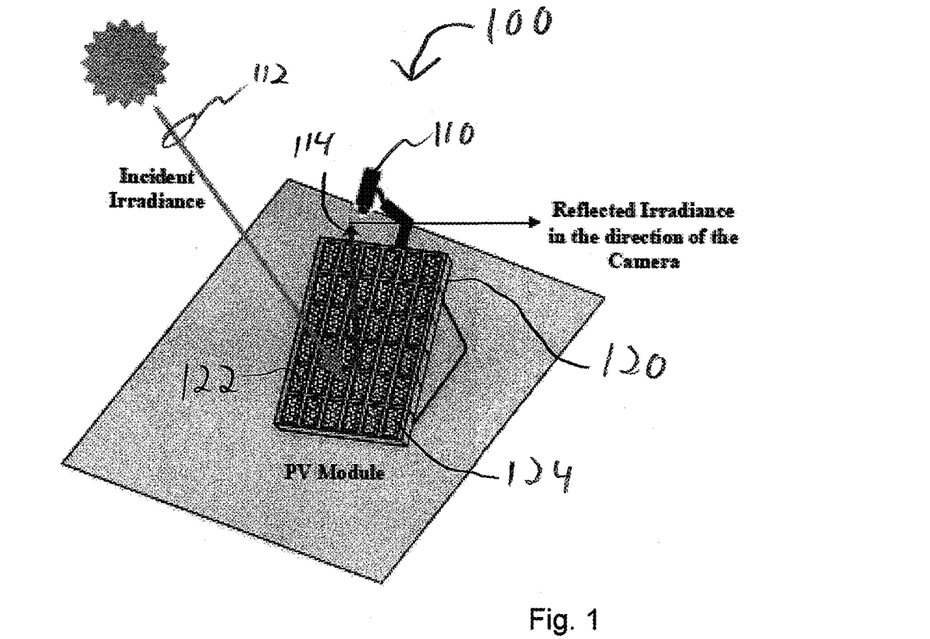
FIG. 1 is a context diagram of a camera detecting irradiated light reflected from a PV panel.

FIG. 1 is a context diagram of an electrical usage environment 100 including a camera 110 positioned for detecting irradiated light reflected from a PV panel 120. The PV panel 120 typically operates in the presence of an irradiated light 112 source such as sunlight. The camera 110 receives images of the irradiated light 112 reflected from a surface 122 of the PV panel 120. The disclosed method of regulating an operating voltage of a solar panel inverter includes receiving camera readings indicative of incident light on the solar panel. The surface 122 is subdivided into plurality of portions, or cells 124, each having a reflected irradiance 114. Different shading effects may be produced by clouds, trees, adjacent towers or structures, as well as subtle differences in the angles to the camera 110, which can result in a different reflected irradiance 114 from the cells 124 of the same panel 120.

Figure 2:
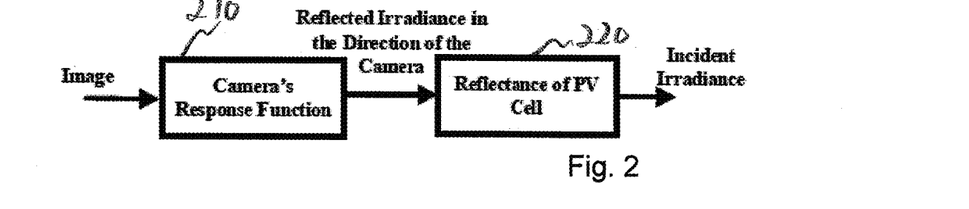
FIG. 2 is a data flow diagram of the irradiance received by the camera of FIG. 1.

FIG. 2 is a data flow diagram of the irradiance received by the camera of FIG. 1. The received readings are employed to compute an operating voltage corresponding to a maximum power generation capability of the solar panel 120. Referring to FIGS. 1 and 2, in the proposed irradiance estimation approach, the camera 110 continuously takes images of the PV module's surface 122, as shown in FIG. 1. The captured images are then processed to extract the incident irradiance on the cells 124 of the PV panel 120.

In FIG. 2, two relations are shown: first, the camera's response function 210, which is the relation between the reflected irradiance 114 in the direction of the camera 112 and the intensity of the corresponding image; and second, the reflectance of the PV cell 220, which is the relation between the incident irradiance on a PV cell and the reflected irradiance in the direction of the camera.

In other words, the camera response function identifies the values received from the camera based on the light intensity received. An optical camera includes of an array of X×Y rectangular grid of photo-sensors sensitive to light. Each photo-sensor is a small rectangular box that converts light into voltage. Digital images are represented by a pixel matrix, which relays the intensity of light received by the corresponding photosensitive sensors. A digital image I(x, y) denotes the image brightness at pixel (x, y) and encodes the intensity recorded by the photo-sensors of the array contributing to that pixel. It is typically an integer in the range [0-255] (typically, 0 is black and 255 is white).

The relation between the received intensity of light at a photo-sensor (x, y) and the corresponding brightness of a pixel I(x, y) is not necessarily linear. There is usually a nonlinear mapping (defined by the camera response function) that determines how radiance in the scene becomes pixel values in the image. The camera response function therefore defines a mapping from received radiance from a scene from a camera field of view to a pixel value in a camera image.

The reflectance of a PV cell 220 refers to how much of the incident irradiance is reflected in the direction of the camera. It is the ratio between the reflected irradiance in the direction of the camera and the incident irradiance on the PV cell. This is a surface property of the panel 120 and is not dependent on the incident light.

Measuring the reflectance of a PV cell requires capturing an image of the cell at a known level of incident irradiance. The ratio between the reflected irradiance in the direction of the camera (which is the outcome of processing the captured image through the camera's response function discussed above) and the known incident irradiance is the reflectance of the PV cell. The operating voltage is computed based on the incident irradiance.

Figure 3:
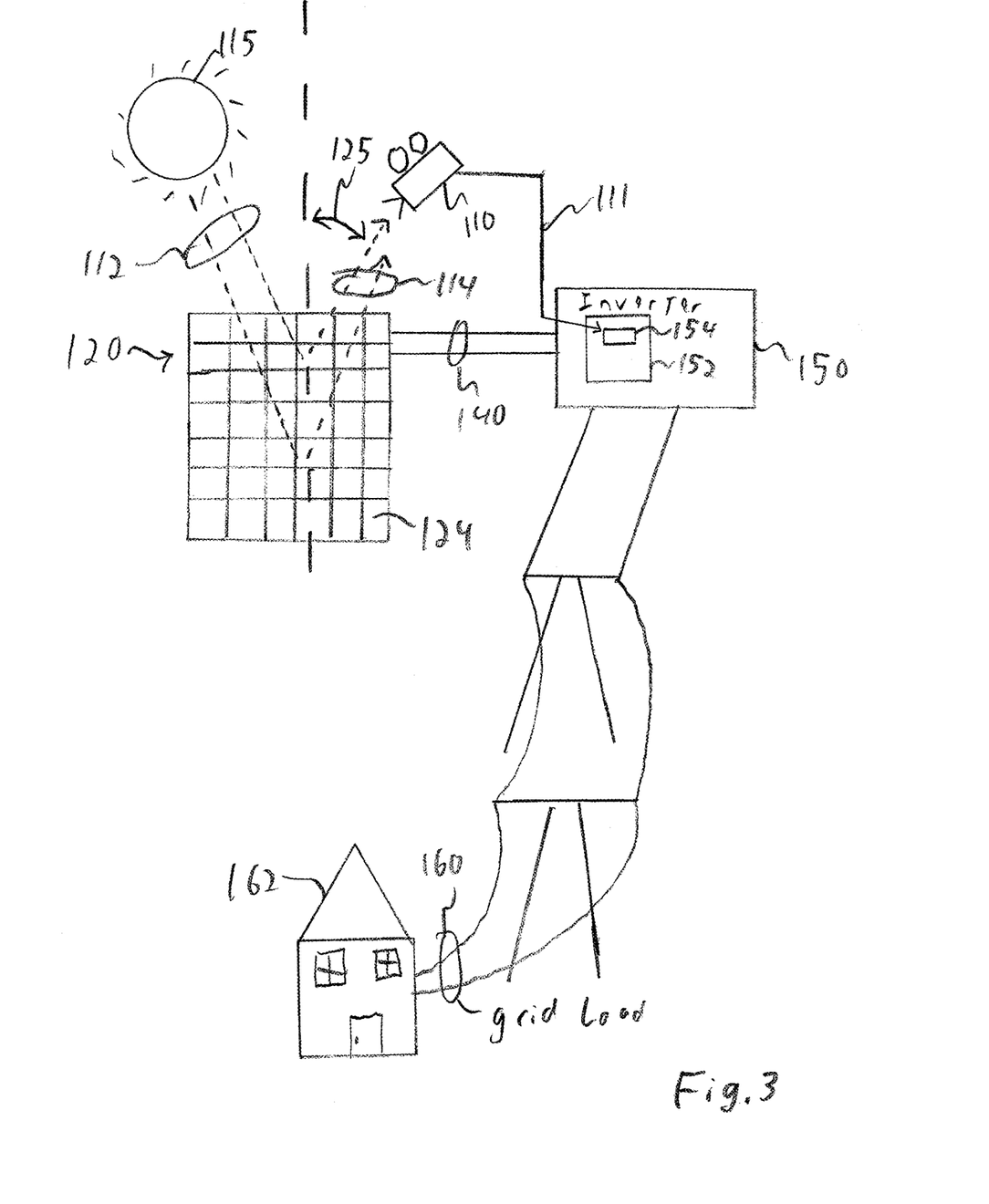
FIG. 3 is a diagram of an inverter for computing a maximum power point according to the irradiance of FIG. 2.

FIG. 3 is a diagram of an inverter for computing a maximum power point according to the irradiance of FIG. 2. Referring to FIGS. 1-3, the PV panel 120 generates a power output 140 in response to a light source 115 such as sunlight, based on irradiance readings received from the camera 110 via a camera interface 111. An inverter 150 connected to the solar panel 120 receives the output power from the solar panel. The inverter has a controller 152 including power curve logic 154 for computing an operating voltage corresponding to a maximum power generation capability of the solar panel 120. The controller 152 directs the inverter 150 to regulate the output power 160 based on the computed operating voltage. The inverter 150 receives the raw generated power, typically a DC signal from the PV panel 120, and converts it into the output power 160 in a useable form, typically 120V AC, to correspond with common electric grid loads in households 162. The inverter 150 is operable for any suitable configuration of output power, as discussed above with conversion between amps and volts. The power curve logic 154 identifies a voltage value on the power curve that corresponds to a maximum power, and the inverter transforms the output power based on the identified voltage to the output power 160.

Figure 4:
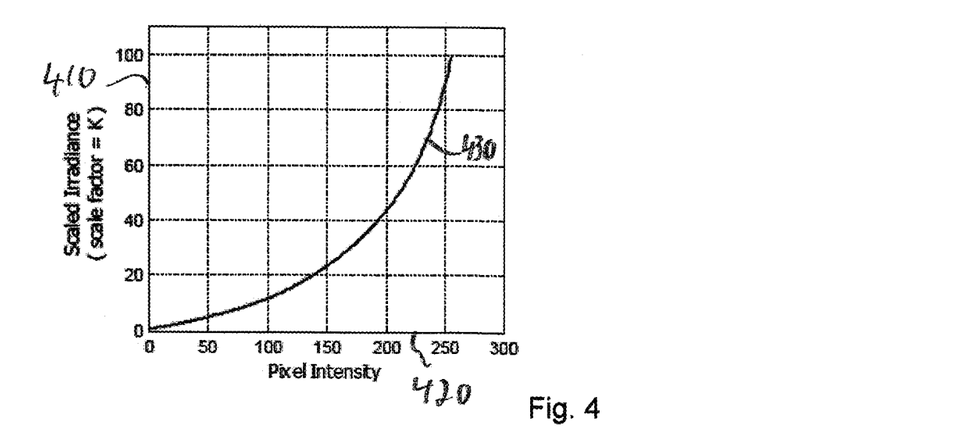
FIG. 4 is a graph of a camera response function used in FIGS. 2 and 3.

FIG. 4 is a graph of a camera response function used in FIGS. 2 and 3. Referring to FIGS. 2-4, the incident light 112 emanates onto the solar panel, such that the camera 110 readings are indicative of irradiated light on the photovoltaic (PV) panel for generating electrical energy from the light. The camera 110 is sensitive to reflected irradiance 114 from the solar panel, and the camera employs the response function based on a portion of the reflected irradiance directed at the camera 110. This irradiated light 114 reflects at an angle 125 from the surface 122, and results in a pixel value in the camera image as per the camera response function. A horizontal axis 420 denotes, for an image pixel intensity captured but the camera, the resulting irradiance 410 reflected from the PV panel. The resulting curve 430 is the camera response function used to map pixel intensities of a camera captured image.

From the captured image, computing the operating voltage includes determining a global maximum on a power curve defining a power output of the solar panel. Computing the operating voltage includes evaluating a single point on a power curve in an absence of traversal of points representative of a lower magnitude of power. In other words, the maximum, or optimal, power point voltage is computed, rather than evaluated by line traversal seeking a (potentially) local maximum. The latter can have a tendency to settle on a less than maximum peak.

The disclosed model in the proposed global power peak estimator is based on the Lambert PV circuit model, as is known in the art. The Lambert approach utilizes a non-transcendental equation which reduces required computational effort. A relationship between the output current I and terminal voltage V of a PV module is represented as:

$$V = (I_{ph} + I_s) \cdot R_{sh} - (R_s + R_{sh}) \cdot I - a \cdot \text{Lambert}(W) \quad (1)$$

$$W = \frac{R_{sh} \cdot I_s}{a} e^{\left(\frac{R_{sh} \cdot (I_{ph} + I_s - I)}{a}\right)} \quad (2)$$

where $I_{ph}$, $I_s$, $R_s$, $R_{sh}$ and $N_s$ are the photon current, saturation current, series resistant, shunt resistant, and the number of series PV cells in a PV module, respectively, and the constants K and q are the Boltzman constant and electron charge, respectively. The parameter a is equal to $N_s KTA/q$, where T is the PV module temperature and A is the ideality factor of the diode (discussed below).

The photon and saturation currents are calculated as:

$$I_{ph} = G \cdot (I_{sc} + \alpha \cdot \Delta T) \quad (3)$$

$$I_s = \left[(I_{sc} + \alpha \cdot \Delta T) - \frac{V_{oc} + \beta \cdot \Delta T}{R_{sh}}\right] \bigg/ \left[e^{\frac{q(V_{oc} + \beta \cdot \Delta T)}{N_s KTA}} - 1\right] \quad (4)$$

where G is the incident irradiance and $\Delta T$ is the difference between the PV cell temperature T and the temperature at standard test conditions (25° C.). The parameters $\alpha$ and $\beta$ are the current and voltage temperature coefficients.

PV modules are composed of series-connected PV cells and bypass diodes. Three bypass diodes are usually used in commercial PV modules. The bypass diodes tend to cause the appearance of multiple peaks in the output power curve. The value of the MPP currents at the power peaks can be calculated by equating the summation of the derivatives of the power-current curves for all series PV cells to zero:

$$\sum_{j=1}^{n_d} Z_j \cdot \left(\sum_{i=1}^{n_s} \frac{dP_i}{dI}\right)_j = 0 \quad (5)$$

where $n_d$ and $n_s$ refer to the numbers of bypass diodes and PV cells connected to each bypass diode, respectively. Here, the variable $Z_j$ is an integer modeling the effect of a bypass diode. It is equal to zero when the corresponding bypass diode is in the conducting state; otherwise, it is equal to one. The derivative of the power-current curve of a PV unit dP/dI is expressed as:

$$\frac{dP}{dI} = V + I \cdot \frac{dV}{dI} \quad (6)$$

where dV/dI is the voltage derivative with respect to current and is expressed as:

$$\frac{dV}{dI} = -(R_s + R_{sh}) - \frac{R_{sh} \cdot (I_{ph} + I_s - I) \cdot \text{Lambert}(W)}{1 + \text{Lambert}(W)} \quad (7)$$

Substituting (1) and (7) in (6) results in:

$$\frac{dP}{dI} = R_{sh} \cdot (I_{ph} + I_s) - \frac{R_{sh} \cdot I \cdot (I_{ph} + I_s - I) \cdot \text{Lambert}(W)}{1 + \text{Lambert}(W)} - 2I \cdot (R_s + R_{sh}) - a \cdot \text{Lambert}(W) \quad (8)$$

Substituting (8) in (5) yields:

$$\sum_{j=1}^{n_d} Z_j \left(\sum_{i=1}^{n_s} \left(R_{sh}(I_{ph_i} + I_{s_i}) - \frac{R_{sh} \cdot (I_{ph_i} + I_{s_i} - I)\text{Lambert}(W_i)I}{[(1 + \text{Lambert}(W_i))]} - 2I \cdot (R_s + R_{sh}) - a_i \cdot \text{Lambert}(W_i)\right)\right)_j = 0 \quad (9)$$

Equation (9) may be solved by any suitable numerical method. Solving (9) for a PV module produces the value of the MPP current corresponding to one of the power peaks. Because multiple power peaks may exist, equation (9) may be solved several times at various initial guesses to determine the MPP currents. The maximum number of power peaks for a PV module is equal to the number of its bypass diodes. Therefore, three initial guesses are usually needed, one for each bypass diode. An initial guess for a bypass diode is best chosen to be 90% of the photon current of the PV cell receiving the lowest irradiance level in a group of cells connected to the bypass diode. The integer $Z_j$ for a group is equal to one if the photon current of the group is higher than the used initial guess, otherwise, it is equal to zero. The power peak at a determined MPP current, resulting from solving (9), can be calculated by summing the powers generated from all the series-connected PV cells operating at the MPP current using:

$$\sum_{j=1}^{n_d} P_j = \sum_{j=1}^{n_d} (Z_j (I \times \sum_{i=1}^{n_s} V_i))_j \quad (10)$$

Substituting (1) in (10), equation (10) becomes:

$$\sum_{j=1}^{n_d} P_j = \sum_{j=1}^{n_d} (Z_j \cdot \sum_{i=1}^{n_d} (Z_j \cdot \sum_{i=1}^{n_s} ((I_{ph_i} + I_{s_i}) \cdot R_{sh} \cdot I - (R_s + R_{sh}) \cdot I^2 - a_i \cdot I \cdot \text{Lambert}(W_i)) - (1 - Z_j) \cdot n_s \cdot I \cdot V_d))_j \quad (11)$$

Relying on equations (9) and (11), which determine the MPP currents and powers, respectively, an MPPT method is provided that is able to find the Global Maximum Power Peak (GMPP) of partially shaded PV modules. The disclosed MPPT approach utilizes the aforementioned equations to analytically find the GMPP and its voltage. Because inaccuracies and/or deviations may be present in the estimated incident irradiances which may affect the accuracy of the determined GMPP, an iterative perturb and observe (P&O) refinement is also considered to correct any imprecision in the determined GMPP.

In the disclosed approach, each PV panel 120 is subdivided into cells 124. Thus, the PV panel 120 includes a plurality of cells, and computation includes receiving a camera reading corresponding to each cell. A plurality of cells further defines a group, which is separated by a diode to accommodate low/zero currents and malfunctioning elements. Any suitable subdivision and grouping of cells may be performed. However, in the example arrangement the plurality of cells comprises 72 cells. The groups further include 3 groups of 24 cells. The electrical separation is defined by a diode for accommodating failure and shading of incident light on the cells 124 in the group. Since each cell may receive a different level of irradiance, accommodation of a number of cells improves performance. Particular arrangements may also include disposing a controller adjacent to each group, and for each controller, computing an operating voltage of the group, and receiving, at the inverter, the computed operating voltage of each group.

Figure 5:
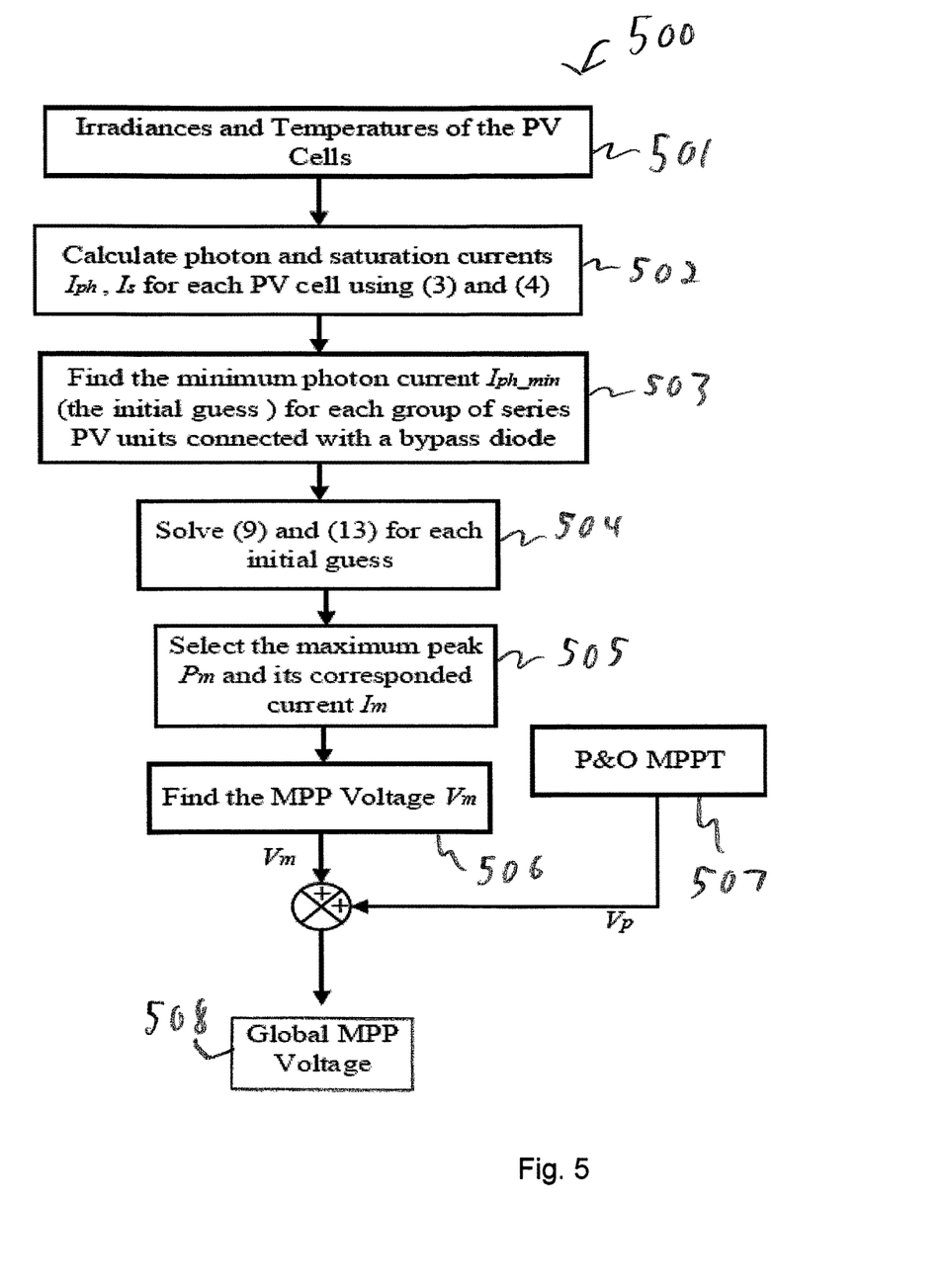
FIG. 5 is a flowchart of maximum power point (MPP) voltage computation in the inverter of FIG. 3.
Figure 6A:
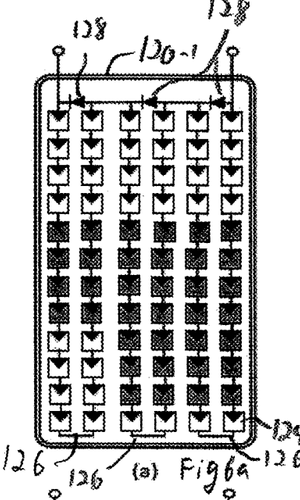
FIGS. 6a-6d are an example of a PV panel for computing an MPP using the flowchart of FIG. 5.
Figure 6B:
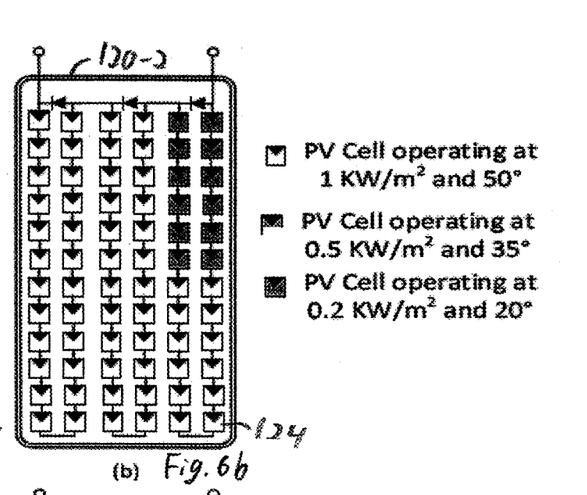
Figure 6C:
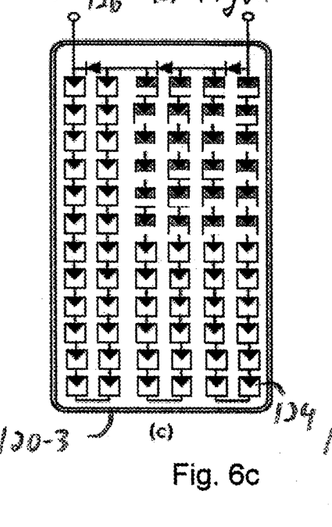
Figure 6D:
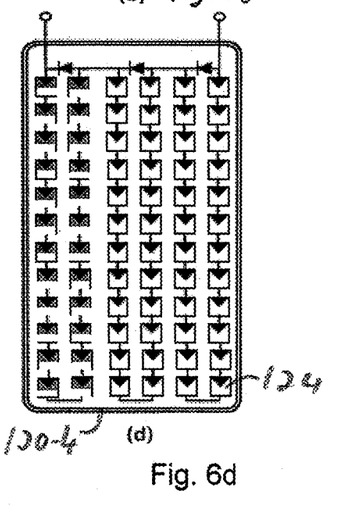

FIG. 5 is a flowchart 500 of maximum power point (MPP) voltage in the inverter of FIG. 3. Referring to FIGS. 3 and 5, At step 501, the camera 110 gathers irradiances and temperatures of the PV panel 120. The power curve logic 154 calculates the photon and saturation currents for all the PV cells using equations (3) and (4), as depicted at step 502. The initial guesses are then estimated. As mentioned earlier, they can be best considered as 90% of the photon currents of the PV cells receiving the lowest irradiance levels in each group of PV cells connected with a bypass diode, as depicted at step 503. The power curve logic 154 solves equations (9) and (13) based on the determined initial guesses, as shown at step 504. This gives the values of MPP powers and currents, as disclosed at step 505. The maximum power peak among the resulting peaks is the GMPP, and its corresponding voltage is the GMPP voltage, as depicted at step 506. Since there may be an inaccuracy or error factor in the irradiance estimation and the mathematical model, the determined GMPP voltage may not be entirely accurate. Therefore, the power curve logic 154 compensates for any deviation in the estimated GMPP by the P&O method for augmenting the computed GMPP, as depicted at step 507. In other words, the disclosed MPPT will find an approximated GMPP in the vicinity of GMPP and then the P&O will converge to a more precise GMPP. This means that if dirt or moisture on the camera affects the accuracy of the irradiance estimation, this will not affect the correct operation of the disclosed approach method. The resulting overall voltage is the final GMPP voltage, as depicted at step 508 which is supplied to the inverter.

It should be noted that the presented MPPT approach employs the irradiances and temperatures of the PV cells. The estimation of the irradiances is already discussed in the previous section. The temperatures can be determined through a thermal model of PV modules.

The difference between the atmospheric and PV cell temperatures is directly related to the irradiance G received by the PV cell as $$\Delta T = K_e \cdot G \quad (12)$$

where $\Delta T$ is the difference between the atmospheric temperature $T_o$ and PV cell temperature T. Based on this relation, knowing the temperature of a reference cell will be sufficient to estimate the temperatures of the rest of the cells. This means that measuring the temperature of one PV cell in the PV module can determine the temperatures of the rest of the cells. This is represented in the following equation, where $T_{co}$ and $G_{co}$ are the temperature and irradiance of the reference PV cell 124, respectively:

$$\dot{T} = T_{co} + K_e \cdot (G - G_{co}) \quad (13)$$

FIGS. 6a-6d are an example of a PV panel for computing an MPP using the flowchart of FIG. 5. Referring to FIGS. 6a-6d, a PV panel undergoes four different shading patterns 120-1 ... 120-4. The PV panel includes 3 groups 126 of 12 cells, each electrically separated by a diode 128. Computing the MPP involves identifying a plurality of groups of the cells, in which each group 126 of cells 124 is defined by an electrical separation from the cells of the other groups resulting from the diode 128. For each group, the power point logic 154 determines a voltage, and computes the operating voltage based on the determined voltage of the group 126 contributing the greatest power. The shading patterns illustrate individual cell shading of either 1 KW/m² at 50° C., partial shading at 0.5 KW/m² at 35° C., or substantial shading at 0.2 KW/m² at 20° C.

Figure 7:
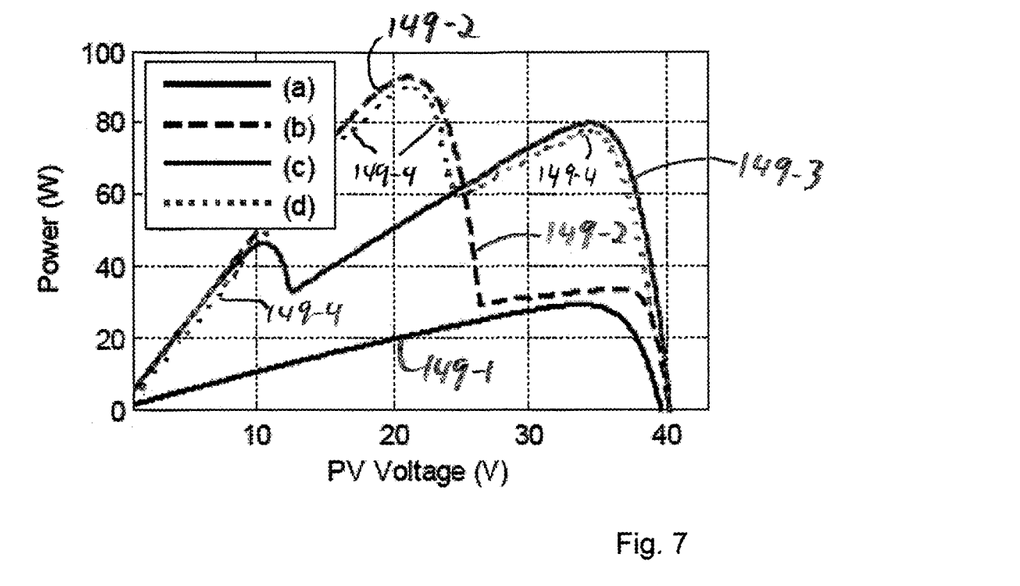
FIG. 7 is a graph of power point curves for the respective shading patterns of the PV panels of FIGS. 6a-6d.

FIG. 7 is a graph of power point curves for the respective shading patterns of the PV panels of FIGS. 6a-6d. Curve (a) 149-1 corresponds to the shading pattern shown by panel 120-1. Curve (b) 149-2 corresponds to the shading pattern shown by panel 120-2. Curve (c) corresponds to the shading panel shown by panel 120-3, and Curve (d) 149-4 applies the shading pattern shown by panel 120-4.

The disclosed MPPT approach is used to extract the maximum power of the PV module under the different shading patterns. An intentional 10% error in the irradiance, temperature and PV model is inserted to check the effectiveness of the method under any inaccuracy in the estimated irradiance and temperature or in the PV model. The resulting extracted power is plotted in FIG. 8. As can be seen, the disclosed approach extracts the global power peaks in each of the four shading scenarios 120-1 ... 120-4.

Figure 8:
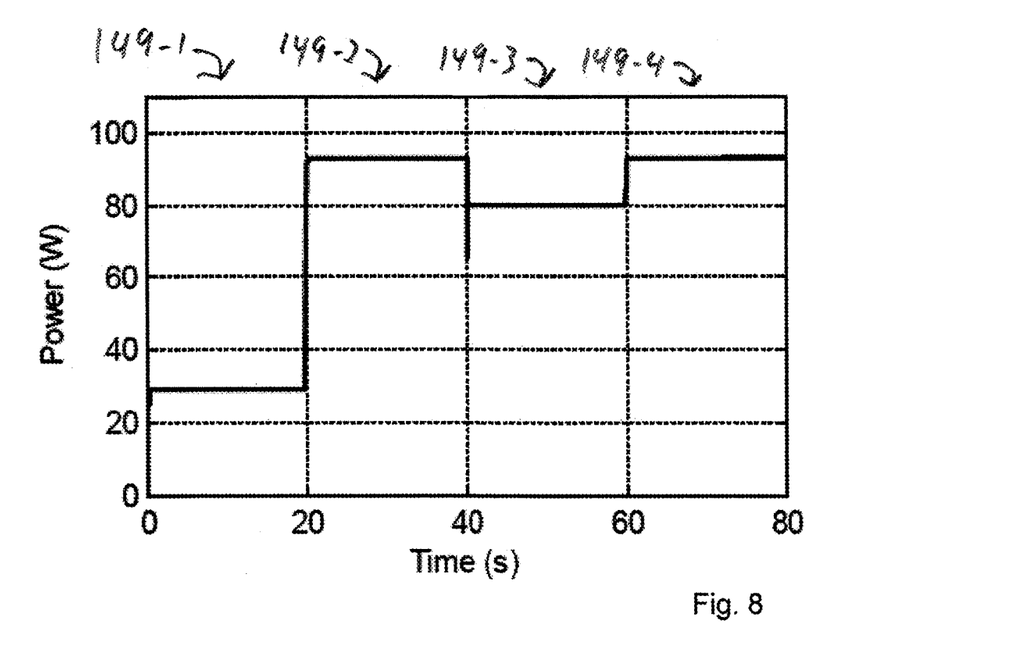
FIG. 8 shows the power extracted based on the power point curves in FIG. 7.

Initially, the power curve logic 154 extracted the maximum power (around 30 W) from the PV module 120-1 operating at the first shading profile shown for panel 120-1. Then, power transitions from the peak of the curve 149-1 to the global peak of the 149-2 curve (around 90 W). It then jumps back again to the global power of the 149-3 curve (around 80 W). Finally, it the logic 154 extracts the global power of the 149-4 curve (around 90 W), thus demonstrating that the proposed method effectively tracks the GMPP under various shading patterns.

Configurations disclosed herein include at least some features that may be implemented by a computer or similar processor based set of programmed instructions. Alternate configurations of the invention may therefore include a multiprogramming or multiprocessing computerized device such as a multiprocessor, controller or dedicated computing device in either a handheld, mobile, or desktop form or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of regulating an operating voltage of a solar panel inverter, comprising:
   receiving camera readings indicative of incident light on a solar panel;
   computing, based on the received readings, an operating voltage corresponding to a maximum power generation capability of the solar panel;
   receiving, at an inverter connected to the solar panel, output power from the solar panel; and
   directing the inverter to regulate an output power based on the received operating voltage.

2. The method of claim 1 wherein the camera readings are indicative of irradiated light on a photovoltaic (PV) panel for generating electrical energy from the light.

3. The method of claim 2 wherein computing the operating voltage includes determining a global maximum on a power curve defining a power output of the solar panel.

4. The method of claim 3 wherein computing the operating voltage includes evaluating a single point on a power curve in an absence of traversal of points representative of a lower magnitude of power.

5. The method of claim 1 wherein the camera is sensitive to reflected irradiance from the solar panel, the camera having a response function based on a portion of the reflected irradiance directed at the camera.

6. The method of claim 1 wherein the solar panel includes a plurality of cells, and further comprising receiving a camera reading corresponding to each sill.

7. The method of claim 2 further comprising:
determining a camera response function that defines a relation between the irradiated light reflected in a direction of the camera and an intensity of a corresponding camera image;
determining a reflectance of the PV panel indicative of incident irradiance from a light source that is reflected in the direction of the camera; and
computing the operating voltage based on the incident irradiance.

8. The method of claim 7 wherein the camera response function defines a mapping from received radiance from a scene from a camera field of view to a pixel value in a camera image.

9. The method of claim 6 further comprising
identifying a plurality of groups of the cells, each group of cells defined by an electrical separation from the cells of the other groups;
for each group, determining a voltage; and
computing the operating voltage based on the determined voltage of the group contributing the greatest power.

10. The method of claim 9 wherein the electrical separation is defined by a diode for accommodating failure and shading of incident light on the cells in the group.

11. The method of claim 9 wherein the plurality of cells comprises 72 cells.

12. The method of claim 11 wherein the groups comprise 3 groups of 24 cells.

13. The method of claim 12 further comprising disposing a controller adjacent to each group, and for each controller, computing an operating voltage of the group; and
receiving, at the inverter, the computed operating voltage of each group.

14. A photovoltaic controller comprising:
a solar panel for generating electrical power at an operating voltage based on available ambient light;
a camera disposed for receiving camera readings indicative of incident light on a solar panel;
power curve logic for computing, based on the received readings, an operating voltage corresponding to a maximum power generation capability of the solar panel;
an inverter connected to the solar panel for receiving output power from the solar panel; and
an interface between the power curve logic and the inverter operable for directing the inverter to regulate an output power based on the received operating voltage.

15. A computer program product on a non-transitory computer readable storage medium having instructions that, when executed by a processor, perform a method of regulating an operating voltage of a solar panel inverter, the method comprising:
receiving camera readings indicative of incident light on a solar panel;
computing, based on the received readings, an operating voltage corresponding to a maximum power generation capability of the solar panel;
receiving, at an inverter connected to the solar panel, output power from the solar panel; and
directing the inverter to regulate an output power based on the received operating voltage.

* * * * *